(12) United States Patent
Maruyama et al.

(10) Patent No.: US 12,482,348 B2
(45) Date of Patent: Nov. 25, 2025

(54) INFORMATION MANAGEMENT DEVICE, INFORMATION MANAGEMENT METHOD AND STORAGE MEDIUM

(71) Applicant: HONDA MOTOR CO., LTD., Tokyo (JP)

(72) Inventors: Kenta Maruyama, Tokyo (JP); Junichiro Onaka, Tokyo (JP); Yusuke Ishida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 18/370,896

(22) Filed: Sep. 21, 2023

(65) Prior Publication Data
US 2024/0105052 A1 Mar. 28, 2024

(30) Foreign Application Priority Data

Sep. 27, 2022 (JP) .................................. 2022-153222

(51) Int. Cl.
*G08G 1/01* (2006.01)
*G01C 21/36* (2006.01)
(Continued)

(52) U.S. Cl.
CPC ....... *G08G 1/0112* (2013.01); *G01C 21/3697* (2013.01); *G06T 11/00* (2013.01);
(Continued)

(58) Field of Classification Search
CPC ... G08G 1/0112; G01C 21/3697; G06T 11/00; H04R 3/00; H04R 2430/01;
(Continued)

(56) References Cited

U.S. PATENT DOCUMENTS 8,270,971 B2 * 9/2012 Akama ................. H04L 63/102
709/227
2003/0212567 A1 * 11/2003 Shintani ................. G06Q 99/00
725/105
(Continued)

FOREIGN PATENT DOCUMENTS

JP 2020-092421 6/2020
JP 2020-094958 6/2020
(Continued)

OTHER PUBLICATIONS

Japanese Office Action for Japanese Patent Application No. 2022-153222 mailed Apr. 30, 2024.

*Primary Examiner* — Rami Khatib
(74) *Attorney, Agent, or Firm* — Amin, Turocy & Watson, LLP

(57) ABSTRACT

An information management device for managing information provided to a plurality of first devices mounted on a mobile object that an occupant boards and a second device used by a user at a location different from the mobile object includes a processor, and the processor is configured to execute a program to acquire information from the plurality of first devices and the second device, match any one of the plurality of first devices with the second device, receive a designation of the user for setting any one of the plurality of first devices as a matching target of the second device, and switch the matching target of the second device when a designation of the user for setting any one of the plurality of first devices as the matching target of the second device already matched with the first device is received.

10 Claims, 11 Drawing Sheets

(51) Int. Cl.
*G06T 11/00* (2006.01)
*H04R 3/00* (2006.01)

(52) U.S. Cl.
CPC .......... *H04R 3/00* (2013.01); *H04R 2430/01* (2013.01); *H04R 2499/13* (2013.01)

(58) Field of Classification Search
CPC ............ H04R 2499/13; H04S 2400/11; H04S 2400/15; H04S 7/304
See application file for complete search history.

(56) References Cited

U.S. PATENT DOCUMENTS

| | | | |
|---|---|---|---|
| 2017/0180971 A1* | 6/2017 | Schuler | H04W 8/24 |
| 2017/0243449 A1* | 8/2017 | Barboni | G06Q 10/02 |
| 2019/0075269 A1* | 3/2019 | Nashida | H04N 21/44218 |
| 2020/0169762 A1* | 5/2020 | Goluguri | H04N 21/47202 |
| 2020/0191598 A1 | 6/2020 | Kusama et al. | |
| 2022/0030420 A1* | 1/2022 | Wong | H04L 63/0876 |
| 2023/0146677 A1* | 5/2023 | Woo | G06F 3/017 |
| | | | 345/156 |

FOREIGN PATENT DOCUMENTS

| | | |
|---|---|---|
| JP | 2021-162876 | 10/2021 |
| WO | 2017/159063 | 9/2017 |

* cited by examiner

FIG. 2

| OCCUPANT ID | COMMUNICATION IDENTIFICATION INFORMATION | USER ID OF TARGET USER | MOBILE OBJECT INFORMATION | PROVISION POSSIBILITY INFORMATION |
|---|---|---|---|---|
| 001 | ... | AAA, DDD, ... | ... | ... |
| 002 | ... | NO RESTRICTION | ... | ... |
| ... | ... | ... | ... | ... |

360A

| USER ID | COMMUNICATION IDENTIFICATION INFORMATION | OCCUPANT ID OF TARGET OCCUPANT | USER INFORMATION |
|---|---|---|---|
| AAA | ... | 001, 005, ... | ... |
| BBB | ... | 006, 007, ... | ... |
| ... | ... | ... | ... |

360B

360

INFORMATION MANAGEMENT DEVICE, INFORMATION MANAGEMENT METHOD AND STORAGE MEDIUM

CROSS-REFERENCE TO RELATED APPLICATION

Priority is claimed on Japanese Patent Application No. 2022-153222, filed Sep. 27, 2022, the content of which is incorporated herein by reference.

FIELD OF THE INVENTION

The present invention relates to an information management device, an information management method, and a storage medium.

BACKGROUND OF THE INVENTION

In the related art, research has progressed on communicating between a device mounted on a mobile object such as a vehicle and a device used by a user at a location other than the mobile object to share, for example, an image of scenery outside the vehicle (see Japanese Unexamined Patent Application, First Publication No. 2020-94958).

SUMMARY OF THE INVENTION

In the related art, when a device used by a user can communicate with a plurality of first devices mounted on a plurality of mobile objects, it may be difficult to adjust a relationship between the device used by the user and a device mounted on a mobile object that actually communicates with the device used by the user.

The present invention has been made in consideration of such circumstances, and an object thereof is to provide an information management device, an information management method, and a storage medium capable of facilitating adjustment of a relationship between a device used by a user and a device mounted on a mobile object.

An information management device, information management method, and storage medium according to the present invention adopt the following configurations.

(1): An information management device according to an aspect of the present invention is an information management device for managing information provided to a plurality of first devices mounted on a mobile object that an occupant boards and a second device used by a user at a location different from the mobile object, the information management device including a processor, wherein the processor is configured to execute a program to acquire information from the plurality of first devices and the second device, match any one of the plurality of first devices with the second device, receive a designation of the user for setting any one of the plurality of first devices as a matching target of the second device, and switch the matching target of the second device when a designation of the user for setting any one of the plurality of first devices as the matching target of the second device already matched with the first device is received.

(2): In the aspect (1), the processor is configured to execute the program to further receive a first operation and a second operation of the user, and stop provision of information between the first device and the second device on the basis of the first operation of the user, and start the provision of information between the first device and the second device on the basis of the second operation of the user.

(3): In the aspect (2), the first device includes a user display device configured to virtually display the user, and the processor is configured to execute the program to provide the first device with first display information for causing the user to be virtually displayed on the user display device in an aspect in which the user escapes from the mobile object when stopping the provision of information to and from the second device.

(4): In the aspect (2), the first device includes a user display device configured to virtually display the user, and the processor is configured to execute the program to provide the first device with second display information for causing the user to be virtually displayed on the user display device in an aspect in which the user rushes into the mobile object when starting the provision of the information to and from the second device.

(5): In the aspect (1), the processor is configured to execute the program to acquire a traffic situation around the first device matched with the second device, and provide a traffic situation around the first device matched with the second device generated by the traffic situation to at least one of the first device or the second device in a case in which the user does not ascertain a position of the mobile object when starting provision of information to and from the second device.

(6): In the aspect (5), the traffic situation includes a traffic situation image expressed on a map as a bird's-eye view of the mobile object and a mobile object around the mobile object.

(7): In the aspect (1) or (4), the first device further includes a speaker configured to output audio, and the processor is configured to execute the program to provide audio information for causing the speaker to output audio of which a volume has been adjusted, to the first device on the basis of a position of the virtually displayed user within the mobile object when the virtually displayed user escapes from or rushes into the mobile object.

(8): In the aspect (6), the processor is configured to execute the program to display a plurality of the mobile objects on the map, and provide a traffic situation image for changing a display aspect of the mobile object on the map according to whether or not a plurality of first devices mounted on the plurality of the mobile objects are able to communicate with the second device.

(9): An information management method including: acquiring, by a computer of an information management device for managing information provided to a plurality of first devices mounted on a mobile object that an occupant boards and a second device used by a user at a location different from the mobile object, information from the plurality of first devices and the second device, matching, by the computer, any one of the plurality of first devices with the second device, receiving, by the computer, a designation of the user for setting any one of the plurality of first devices as a matching target of the second device, and switching, by the computer, the matching target of the second device when a designation of the user for setting any one of the plurality of first devices as the matching target of the second device already matched with the first device is received.

(10): A computer-readable non-transitory storage medium having a program stored therein, the program causing a computer of an information management device for managing information provided to a plurality of first devices mounted on a mobile object that an occupant boards and a second device used by a user at a location different from the mobile object to perform acquiring information from the plurality of first devices and the second device, matching any one of the plurality of first devices with the second device, receiving a designation of the user for setting any one of the plurality of first devices as a matching target of the second device, and switching the matching target of the second device when a designation of the user for setting any one of the plurality of first devices as the matching target of the second device already matched with the first device is received.

According to the aspects (1) to (10), it is possible to enhance the sense of realism given to both an occupant of the mobile object and a user who is in a different location from the mobile object.

BRIEF DESCRIPTION OF THE DRAWINGS

FIG. 2 is a diagram showing an example of content of user data 360.

DETAILED DESCRIPTION OF THE INVENTION

Hereinafter, embodiments of an information management device, an information management method, and a storage medium of the present invention will be described with reference to the drawings. Hereinafter, an information processing system to which the information management device is applied will be described. The information processing system includes, for example, a first device mounted on a mobile object that an occupant boards, a second device that is used by a user at a location different from the mobile object, and an information management device. The mobile object is, for example, a vehicle, but may be any mobile object (for example, a ship or a flying object) as long as the occupant can board the mobile object. Further, the occupant is mainly a driver of the mobile object, but may be an occupant other than the driver.

Between the first device and the second device, audio collected by a microphone is transmitted to the other party and played back by the speaker so that a telephone call is performed, and further, a part of an image captured by the first device is displayed by the second device so that mixed reality (MR) is provided to the second device. Accordingly, the user of the second device can feel as if the user performs simulated boarding of the mobile object (simulated boarding experience) while being at a different location from the mobile object, and the occupant can have a conversation with the user who performs the simulated experience of boarding the mobile object via the first device so that the user can feel as if the user is actually boarding the mobile object together. Hereinafter, the user performs simulated experience as if the user is actually boarding in the mobile object, as described above, may be referred to as "simulated boarding". The first device and the second device do not need to be in a one-to-one relationship, and one of the plurality of first devices and a plurality of second devices may be matched in a one-to-many relationship to operate as an information processing system. In the latter case, it is possible to cause, for example, one occupant to communicate with a plurality of users simultaneously or in sequence. The matching may be performed between the first device and the second device, or may be performed between an occupant boarding a mobile object having the first device mounted thereon and a user who uses the second device, and both are synonymous.

<Basic Configuration>

Figure 1:
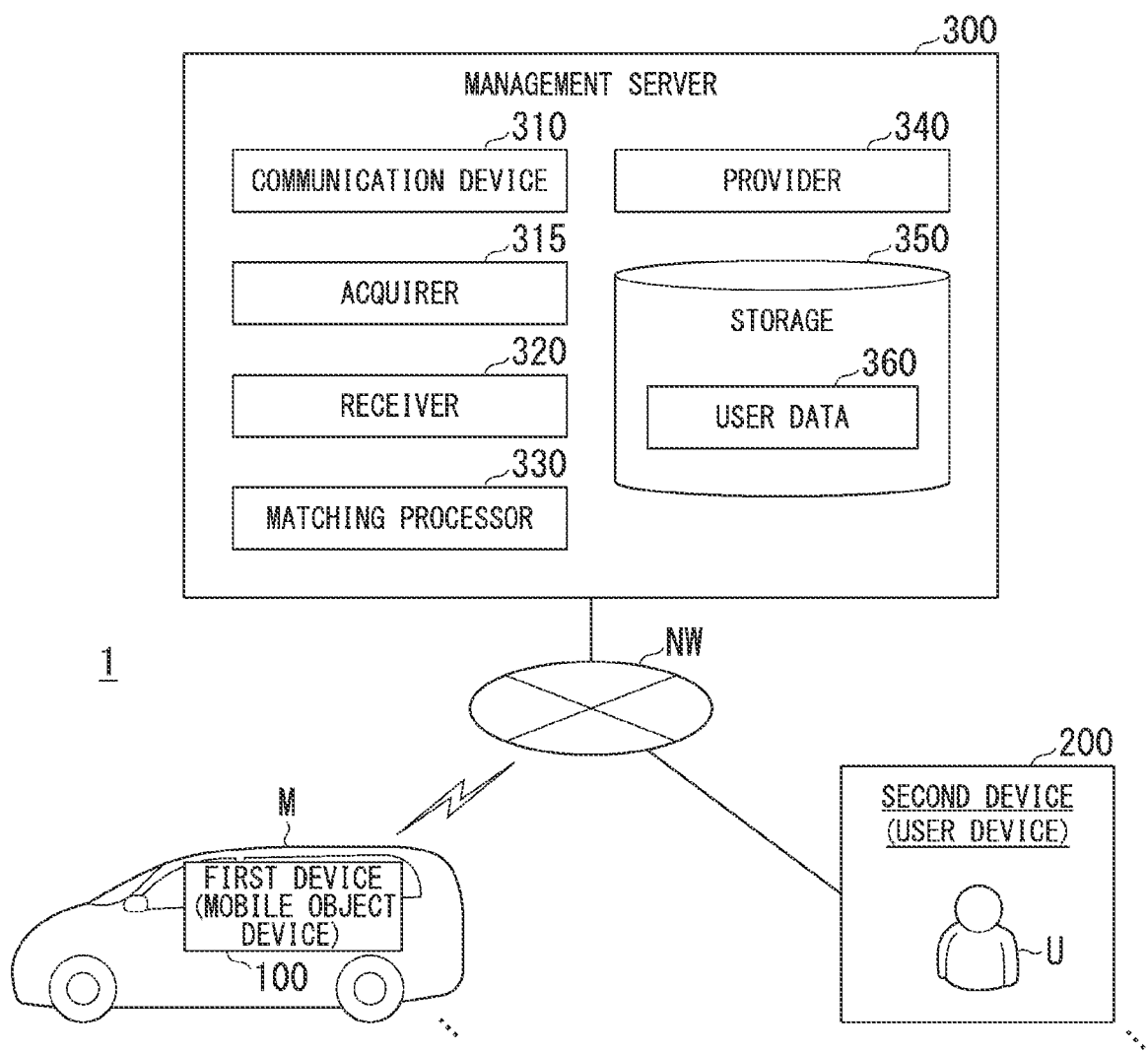
FIG. 1 is a diagram showing a usage environment or the like of an information processing system 1 and a management server 300.

FIG. 1 is a diagram showing a usage environment and the like of an information processing system 1 and the management server 300. The information processing system 1 includes a first device (mobile object device) 100 mounted on a mobile object M, and a second device (user device) 200 used by a user U at a location different from the mobile object M (which may be a location close to the mobile object M). The first device 100, the second device 200, and the management server 300 communicates with each other via a network NW. The information processing system 1 may or may not include the management server 300. The network NW includes, for example, at least one of the Internet, a wide area network (WAN), a local area network (LAN), a mobile communication network, a cellular network, and the like. The management server 300 is an example of an "information management device". The management server 300 may be realized in a server device or storage device incorporated in a cloud computing system. In this case, functions of the management server 300 may be realized by a plurality of server devices or storage devices in the cloud computing system.

The management server 300 manages information provided to each of the first device 100 and the second device 200 or performs management for communications between the devices. The management server 300 includes, for example, a communication device 310, an acquirer 315, a receiver 320, a matching processor 330, a provider 340, and a storage 350. The acquirer 315, the receiver 320, the matching processor 330, and the provider 340 are realized by a hardware processor such as a central processing unit (CPU) executing a program (software), for example. Some or all of these components may be realized by hardware (including circuitry) such as a large-scale integration (LSI), application specific integrated circuit (ASIC), field-programmable gate array (FPGA), and graphics processing unit (GPU), or may be realized by cooperation of software and hardware. The program may be stored in advance in a storage device (a storage device including a non-transitory storage medium) such as a hard disk drive (HDD) or flash memory, or may be stored in a removable storage (non-transitory storage medium) such as a DVD or CD-ROM and installed by the storage medium being mounted on a drive device. User data 360 is stored in the storage 350.

The communication device 310 is a communication interface for connection to the network NW. Communication between the communication device 310 and the first device 100 and communication between the communication device 310 and the second device 200 are performed according to Transmission Control Protocol/Internet Protocol (TCP/IP), for example.

The acquirer 315 acquires various types of information transmitted by the first device 100, the second device 200, and other external devices via the network NW. The acquirer 315 acquires a matching request transmitted by the first device 100 and the second device 200, for example. The acquirer 315 acquires, for example, a matching request (hereinafter referred to as a switching request) for switching a matching target transmitted by the second device 200 already matched with the first device 100 to another first device 100.

The acquirer 315 acquires a surroundings information request transmitted by a user U of the second device 200 before transmitting the switching request. The acquirer 315 acquires a traffic situation around the mobile object on which the first device 100 matched with the second device 200 is mounted, for example, on the basis of traffic information transmitted by an external device such as a road traffic center.

The acquirer 315 acquires first operation information according to a first operation of the user U and second operation information according to a second operation of the user U, which are transmitted by the second device 200. The first operation is an operation for stopping the provision of information between the first device 100 and the second device 200. The second operation is an operation for starting information provision between the first device 100 and the second device 200.

The receiver 320 receives the matching request, the surroundings information request, the switching request, the first operation information, and the second operation information acquired by the acquirer 315.

For example, when the communication device 310 receives the matching request from the user U via the second device 200 or from the occupant P via the first device 100, the matching processor 330 refers to user data 360 to perform matching between the occupant P and the user U (the first device 100 and the second device 200), and uses the communication device 310 to transmit the communication identification information of the first device 100 of the occupant P to the second device 200 of the matched user U and transmit the communication identification information of the second device 200 of the user U to the matched first device 100 of the occupant P. It becomes possible to execute communication with higher real-time characteristics conforming to, for example, user datagram protocol (UDP) between the first device 100 that has received the communication identification information and the second device 200.

The matching processor 330 determines whether the switching of the first device 100 that is a matching target of the second device 200 can be switched, on the basis of the switching request received by the receiver 320 and the user data stored in the storage 350. The matching processor 330 generates determination result information indicating a determination result and transmits the determination result information to the second device 200.

The provider 340 generates information to be provided to each of the first device 100 and the second device 200 on the basis of various types of information acquired by the acquirer 315, and transmits the generated information to the target device. The provider 340 generates a traffic situation image on the basis of the traffic information acquired by the acquirer 315, for example, when the receiver 320 receives the surroundings information request. The provider 340 uses the communication device 310 to transmit the generated traffic situation image to the second device 200 that has transmitted the surroundings information request.

The provider 340 transmits communication stop information for stopping the communication between the first device 100 and the second device 200 to the second device 200 and the first device 100 when the receiver 320 receives the first operation information. The provider 340 includes first display information and first volume adjustment information in the communication stop information to be transmitted to the first device 100. The first display information is information for causing the user display device 150 to virtually display the user U in an aspect in which the user escapes from the mobile object M. The first volume adjustment information is information on volume that is adjusted on the basis of a position of a virtually displayed user U within the mobile object M, on the basis of the first display information. The first volume adjustment information is information in which the volume increases as the position of the virtually displayed user U inside the mobile object M is closer to a fixed position (for example, a passenger seat).

The provider 340 provides communication start information for starting the communication between the first device 100 and the second device 200 to the second device 200 and the first device 100 when the receiver 320 receives the second operation information. The communication start information includes communication identification information of the second device 200 of the user U and the first device 100 of the occupant P. The provider 340 includes the second display information and the second volume adjustment information in the communication start information to be transmitted to the first device 100. The second display information is information for causing the user display device 150 to virtually display the user U in an aspect in which the user rushes into the mobile object M. The second volume adjustment information is information on volume that is adjusted on the basis of the position of the virtually displayed user U within the mobile object M, on the basis of the second display information. The second volume adjustment information is information in which the volume increases as the position of the virtually displayed user U within the mobile object M is closer to the fixed position, like the first volume adjustment information.

The storage 350 may be realized by the various storage devices described above, a solid-state drive (SSD), an electrically erasable programmable read only memory (EEPROM), a read only memory (ROM), a random-access memory (RAM), or the like. The storage 350 can store, for example, the user data 360, programs, and various types of other information.

FIG. 2 is a diagram showing an example of content of the user data 360. The user data 360 includes an occupant list 360A and a user list 360B. In the occupant list 360A, for example, an occupant ID that is identification information of the occupant P of the mobile object M, communication identification information (IP address, or the like) thereof, a user ID that is identification information of the user U that is a matching target, and information on the mobile object that the occupant P is boarding are associated with each other. Device information (mounted device information) mounted on the mobile object M, or vehicle class information indicating a size or shape of the mobile object M, for example, is included in the mobile object information. Further, information on a current position or destination of the mobile object M, and a surroundings situation (for example, traveling on a coastal road), which is transmitted from the mobile object M at predetermined intervals, may be included in the mobile object information.

The occupant list 360A may include provision possibility information set by the occupant P. The provision possibility information is information that can be provided by the mobile object M or information that cannot be provided, and is set by the occupant P, for example. The provision possibility information may be set for each device mounted on the mobile object M, or may be set for each user U. Examples of the provision possibility information may include "provision of an image is permitted", "provision of audio is not permitted", "provision of an interior image is permitted but provision of an exterior image is not permitted", "provision of an image of an occupant is not permitted", and "use of a navigation device is not permitted," but are not limited thereto. The user data 360 may be generated in any aspect other than the aspect shown in FIG. 2.

In the user list 360B, for example, the user ID, communication identification information (IP address, or the like) thereof, the occupant P that is a matching target, and the user information are associated with each other. The user information may include information on physique (for example, a height or sitting height), information for predicting the physique (for example, age), and the like.

Figure 3:
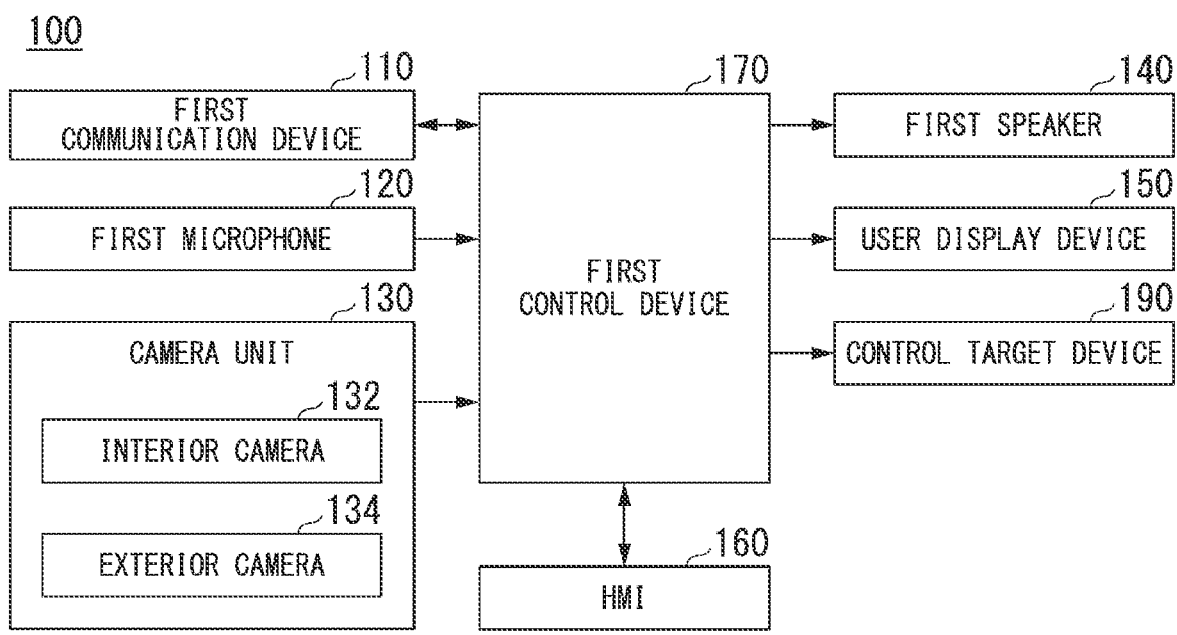
FIG. 3 is a configuration diagram of a first device 100.

FIG. 3 is a configuration diagram of the first device 100. The first device 100 includes, for example, a first communication device 110, a first microphone 120, a camera unit 130, a first speaker 140, a user display device 150, a human machine interface (HMI) 160, a first control device 170. The first control device 170 is connected to a control target device 190 mounted on the mobile object M.

The first communication device 110 is a communication interface for communicating with each of the communication device 310 of the management server 300 and the second communication device 210 of the second device 200 via the network NW.

The first microphone 120 collects at least audio uttered by the occupant P. The first microphone 120 may be provided in the interior of the mobile object M and have sensitivity capable of collecting audio outside the mobile object M, or may be include a microphone provided in the interior of the mobile object M and a microphone provided outside the mobile object M. The first microphone 120 outputs the collected audio to first control device 170.

The camera unit 130 includes at least an interior camera 132 and may include an exterior camera 134. The interior camera 132 is provided in an interior of the mobile object M, for example. The camera unit 130 outputs a captured image to the first control device 170. The first speaker 140 outputs the audio uttered by the user U, which has been acquired via the first communication device 110. Details such as the disposition of the camera unit 130 and the first speaker 140 will be described below with reference to FIG. 4.

The user display device 150 virtually displays the user U as if the user U is inside the interior of the mobile object M. For example, the user display device 150 causes a hologram to appear or causes the user U to be displayed in a portion corresponding to a mirror or a window of the mobile object M. The fixed position of the virtually displayed user U is, for example, the passenger seat adjacent to the driver seat in which the occupant P sits. The fixed position when there is a fellow passenger in the passenger seat is, for example, a rear seat.

When the HMI 160 receives the first display information transmitted by the management server 300, the user display device 150 virtually displays the user U in the interior of the mobile object M in an aspect in which the user escapes from the mobile object M. When the HMI 160 receives the second display information transmitted by the management server 300, the user display device 150 virtually displays the user U in the interior of the mobile object M in an aspect in which the user rushes into the mobile object M.

The HMI 160 is a touch panel, an audio response device (an agent device), or the like. The HMI 160 receives various instructions from the occupant P with respect to the first device 100 and provides various types of instruction pieces of information to the occupant P.

The first control device 170 includes, for example, a processor such as a CPU, and a storage medium that is connected to the processor and stores a program (a group of instructions), and the processor executes the group of instructions to control each unit of the first device 100. The first control device 170 generates audio information on the audio output by the first microphone 120. The first control device 170 generates image information on the image output by the camera unit 130. The first communication device 110 transmits the audio information and the image information generated by the first control device 170 to the second communication device 210 and the communication device 310.

The control target device 190 is, for example, an in-vehicle device such as a navigation device that guides a route to a destination, which is mounted on the mobile object M, or a driving support device that controls one or both of steering and speed of the mobile object M and supports the driving of the occupant P. The control target device 190 may include a seat driving device capable of adjusting a position (front, back, left, and right), orientation, and height of a seat.

Figure 4:
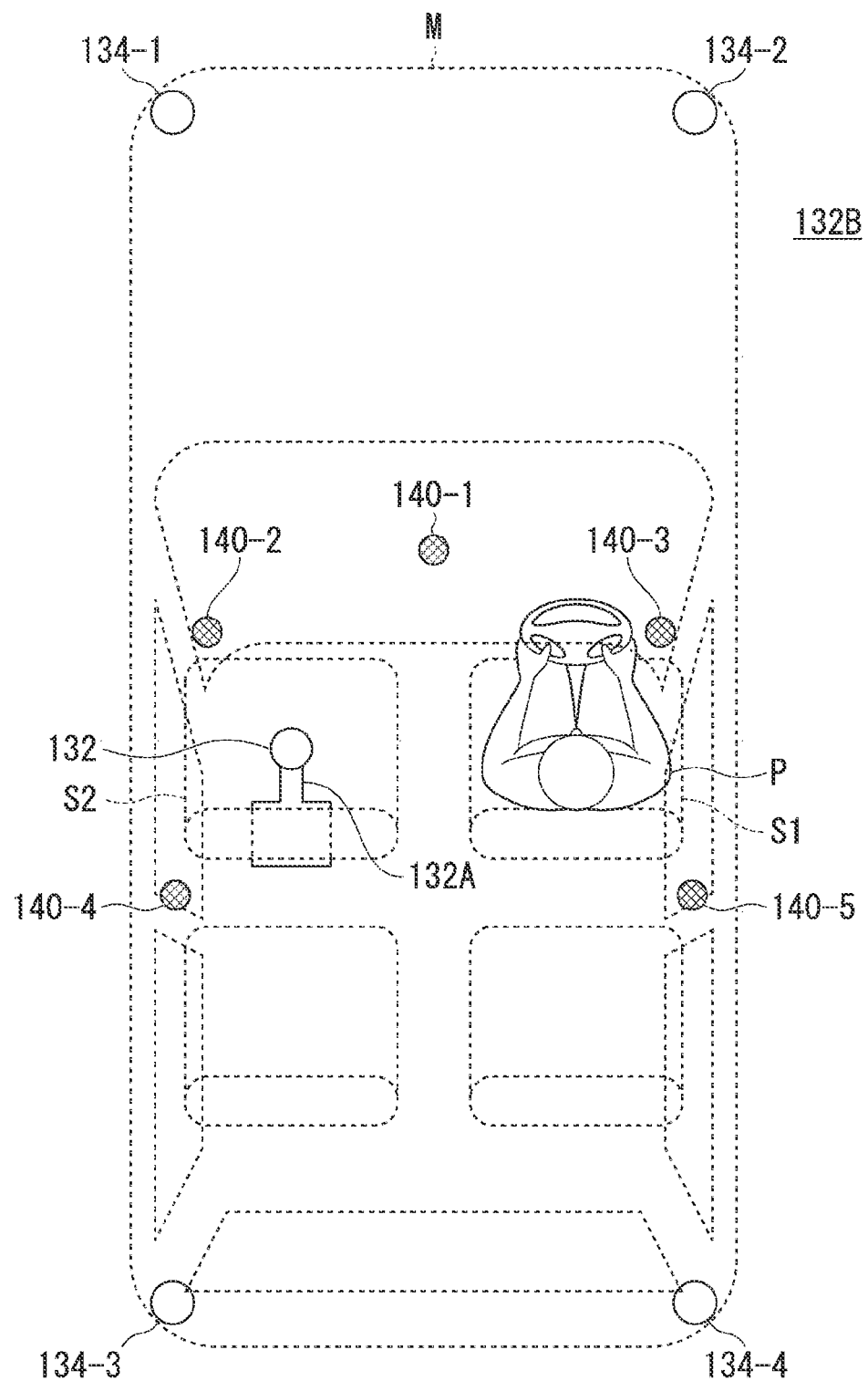
FIG. 4 is a diagram showing a disposition example of part of the first device 100 in a mobile object M.

FIG. 4 is a diagram showing a disposition example of part of the first device 100 in the mobile object M. The interior camera 132, for example, is attached to a neck pillow of the passenger seat S2 (an example of a "predetermined seat") via an attachment 132A, and is provided at a position slightly deviating in a traveling direction of the mobile object M from a backrest of the passenger seat S2. The interior camera 132 includes a wide-angle lens and can image a range represented by a hatched area 132B in FIG. 4. The interior camera 132 can photograph not only the interior of the mobile object M but also the exterior through the window. In the following description, although it is assumed that the passenger seat S2 is the predetermined seat, the predetermined seat may be another seat such as a rear seat.

The exterior camera 134 includes, for example, a plurality of child exterior cameras 134-1 to 134-4. An image such as a panoramic image obtained by imaging the outside of the mobile object M can be obtained by combining images captured by the plurality of child exterior cameras 134-1 to 134-4. The exterior camera 134 may include a wide-angle camera provided on a roof of the mobile object M instead of (or in addition to) these. As the interior camera 132, a camera capable of imaging a region behind the passenger seat S2 may be added, and a mobile object image to be described below may be generated as a 360-degree panoramic image by the first control device 170 combining images captured by one or more interior cameras 132, or may be generated as a 360-degree panoramic image by appropriately combining an image captured by the interior camera 132 and an image captured by the exterior camera 134.

The first speaker 140 outputs the audio of the user U acquired via the first communication device 110. The first speaker 140 includes, for example, a plurality of child first speakers 140-1 to 140-5. For example, the child first speaker 140-1 is disposed at a center of the instrument panel, the child first speaker 140-2 is disposed at a left end portion of the instrument panel, the child first speaker 140-3 is disposed at a right end portion of the instrument panel, and the child first speaker 140-4 is disposed in a lower portion of a left door, and the child first speaker 140-5 is disposed in a lower portion of a right door. When the first control device 170 causes the audio of the user U to be output to the first speaker 140, the first control device 170 causes, for example, the audio to be output at the same volume from the child first speaker 140-2 and the child first speaker 140-4 and turns off the other child first speakers, to thereby localize an audio image so that the audio can be heard from the passenger seat S2 with respect to the occupant P seated on the driver seat S1. Further, an audio image localization method is not limited to volume adjustment, and may be performed by shifting a phase of the audio output by each child first speaker. For example, when the audio image is localized so that the audio can be heard from the left side, a timing at which the audio is output from the left child first speaker may be slightly earlier than a timing at which the same audio is output from the right child first speaker.

Further, when the first control device 170 causes the first speaker 140 to output the audio of the user U, the first control device 170 may localize the audio image so that the occupant P can hear audio from a position of a height corresponding to a height of a head of the user U on the passenger seat S2, and cause the first speaker 140 to output the audio uttered by the user U. In this case, the first speaker 140 needs to include a plurality of child first speakers 140-*k* (k is a natural number equal to or greater than 1) with different heights.

Figure 5:
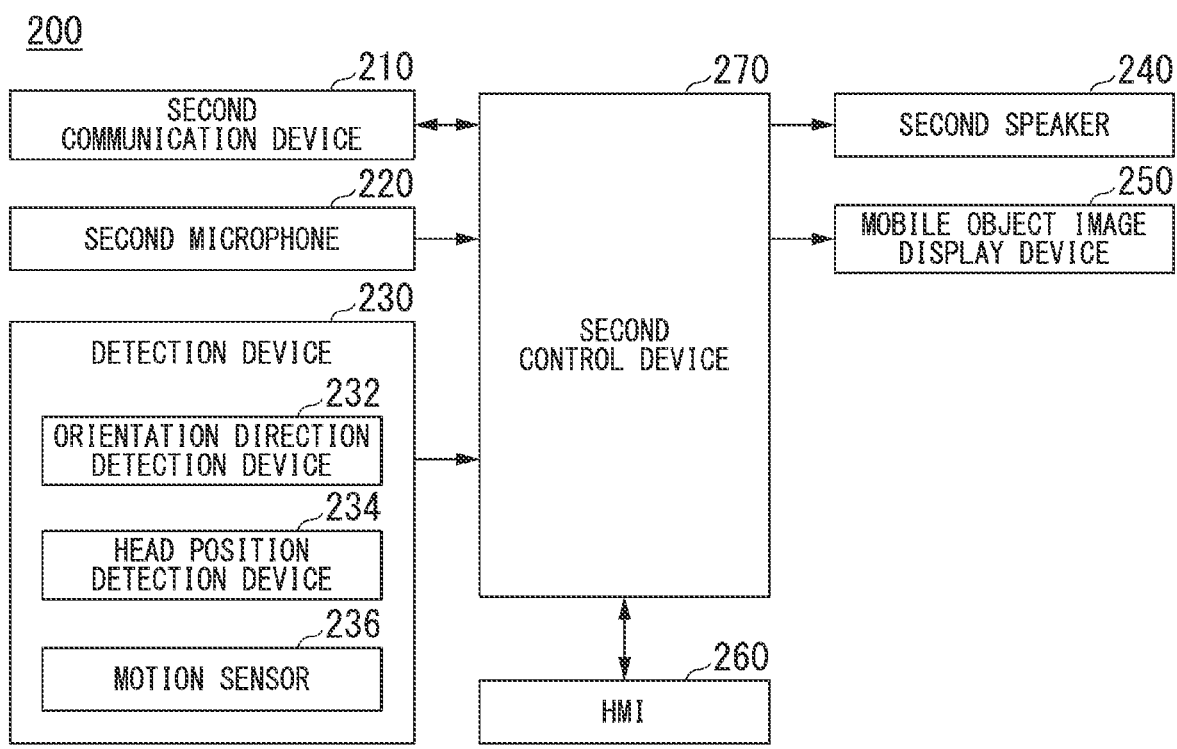
FIG. 5 is a configuration diagram of a second device 200.

FIG. 5 is a configuration diagram of the second device 200. The second device 200 includes, for example, a second communication device 210, a second microphone 220, a detection device 230, a second speaker 240, a mobile object image display device 250, an HMI 260, and a second control device 270. The detection device 230 includes, for example, an orientation direction detection device 232, a head position detection device 234, and a motion sensor 236.

The second communication device 210 is a communication interface for communicating with each of the communication device 310 of the management server 300 and the first communication device 110 of the first device 100 via the network NW.

The second microphone 220 collects the audio uttered by the user U. The audio collected by the second microphone 220 is transmitted to the first communication device 110 by the second communication device 210 via the second control device 270, for example.

The orientation direction detection device 232 is a device for detecting an orientation direction. The orientation direction is an orientation of a face of the user U, an orientation of a line of sight, or an orientation based on both. Hereinafter, the orientation direction may be an angle on a horizontal plane, that is, an angle that does not have a component in an up-down direction, but the orientation direction may be an angle that also includes a component in the up-down direction. The orientation direction detection device 232 may include a physical sensor (for example, an acceleration sensor or a gyro sensor) attached to a VR goggle to be described below, may be an infrared sensor that detects a plurality of positions of the head of the user U, or a camera that images the head of the user U. In either case, the second control device 270 calculates the orientation direction on the basis of the information input from the orientation direction detection device 232. Since various technologies are known for this, a detailed description thereof will be omitted.

The head position detection device 234 is a device for detecting a position (height) of the head of the user U. For example, one or more infrared sensors or optical sensors provided around a chair on which the user U sits are used as the head position detection device 234. In this case, the second control device 270 detects the position of the head of the user U on the basis of the presence or absence of detection signals from the one or more infrared sensors or optical sensors. Further, the head position detection device 234 may be the acceleration sensor attached to the VR goggle. In this case, the second control device 270 detects the position of the head of the user U by integrating a value obtained by subtracting a gravitational acceleration from an output of the acceleration sensor. Information on the position of the head acquired in this way is provided as height information to the second control device 270. The position of the head of the user U may be acquired on the basis of an operation of the user U with respect to the HMI 260. For example, the user U may input a height of the user U as a number to the HMI 260, or may input the height using a dial switch included in the HMI 260. In these cases, the position of the head or height information is calculated from the height. Further, the user U may input a discrete value such as physique: large/medium/small to the HMI 260 instead of a continuous value. In this case, the height information is acquired on the basis of the information indicating the physique. Further, the height of the head of the user U is not particularly acquired, and the height of the head of the user U may be simply acquired on the basis of a physique of a normal adult (a man or a woman).

The motion sensor 236 is a device for recognizing gesture operations performed by the user U. For example, a camera that images an upper body of the user U is used as the motion sensor 236. In this case, the second control device extracts a feature point (a fingertip, a wrist, an elbow, or the like) of the body of the user U from the image captured by the camera, and recognizes a gesture operation of the user U on the basis of a movement of the feature point.

The second speaker 240 outputs the audio uttered by the occupant P, which has been acquired via the second communication device 210. The second speaker 240 has, for example, a function of changing a direction from which the audio is heard. The second control device 270 causes the second speaker to output the audio so that the user U can hear the audio from the position of the occupant P as seen from the passenger seat S2. The second speaker 240 includes a plurality of child second speakers 240-*n* (n is a natural number equal to or greater than 1), the audio image may be localized by the second control device 270 adjusting the volume of each child second speaker 240-*n*, or the audio image may be localized by using a function of a headphone when the headphone is attached to the VR goggle.

Figure 6:
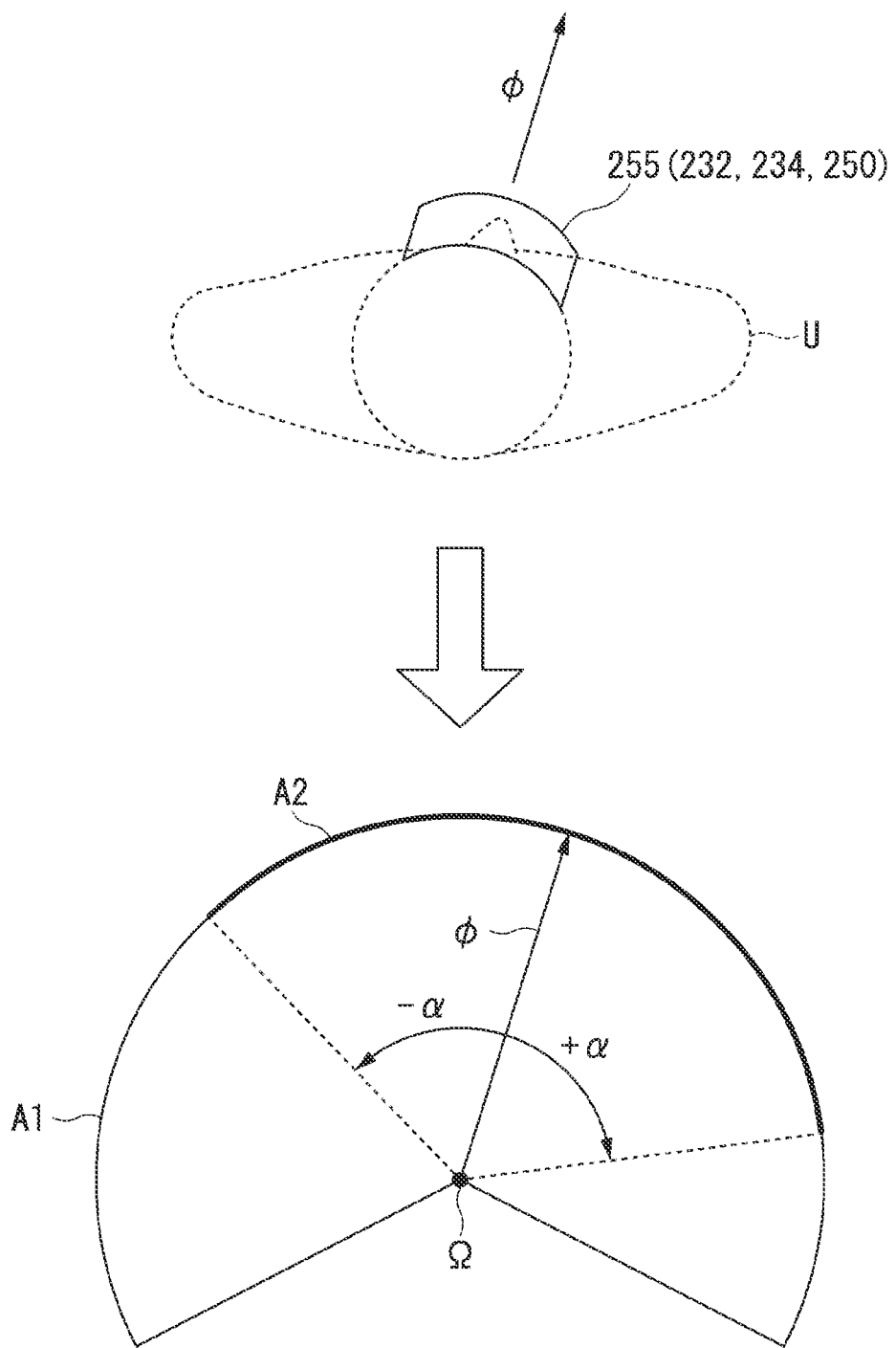
FIG. 6 is a diagram showing an image corresponding to an orientation direction.

The mobile object image display device 250 displays an image corresponding to the orientation direction as seen from the passenger seat among images captured by the camera unit 130 (which may be an image subjected to the above-described combination process, and the image is hereinafter referred to as a mobile object image). FIG. 6 is a diagram showing an image corresponding to an orientation direction. In the example of FIG. 6, a VR goggle 255 includes an orientation direction detection device 232, a physical sensor serving as a head position detection device 234, and a mobile object image display device 250. The second control device 270 detects a direction to which the VR goggle 255 is directed, as an orientation direction φ, with a pre-calibrated direction set as a reference direction. Since various schemes have already been known for such functions, a detailed description thereof will be omitted.

The mobile object image display device 250 displays an image A2 within an angle range of plus or minus α with the orientation direction φ as a center toward the user U in the mobile object image A1 (which has an angle of about 240 degrees in the figure, but an angle of view may be expanded through the combination process as described above).

The mobile object image display device 250 displays various types of information transmitted by the management server 300 on a display screen. Images that can be displayed on the mobile object image display device 250 include the determination result information and the traffic situation image transmitted by the management server 300, in addition to, for example, the image captured by the camera unit 130. The determination result information is information indicating whether or not switching (switching of the first device 100) is possible when the switching request has been transmitted. The traffic situation image is an image obtained by expressing, on a map, a bird's-eye view image of a predetermined area, such as a traffic situation of a plurality of mobile objects including the mobile object M and an area in which the mobile objects travel.

Figure 7:
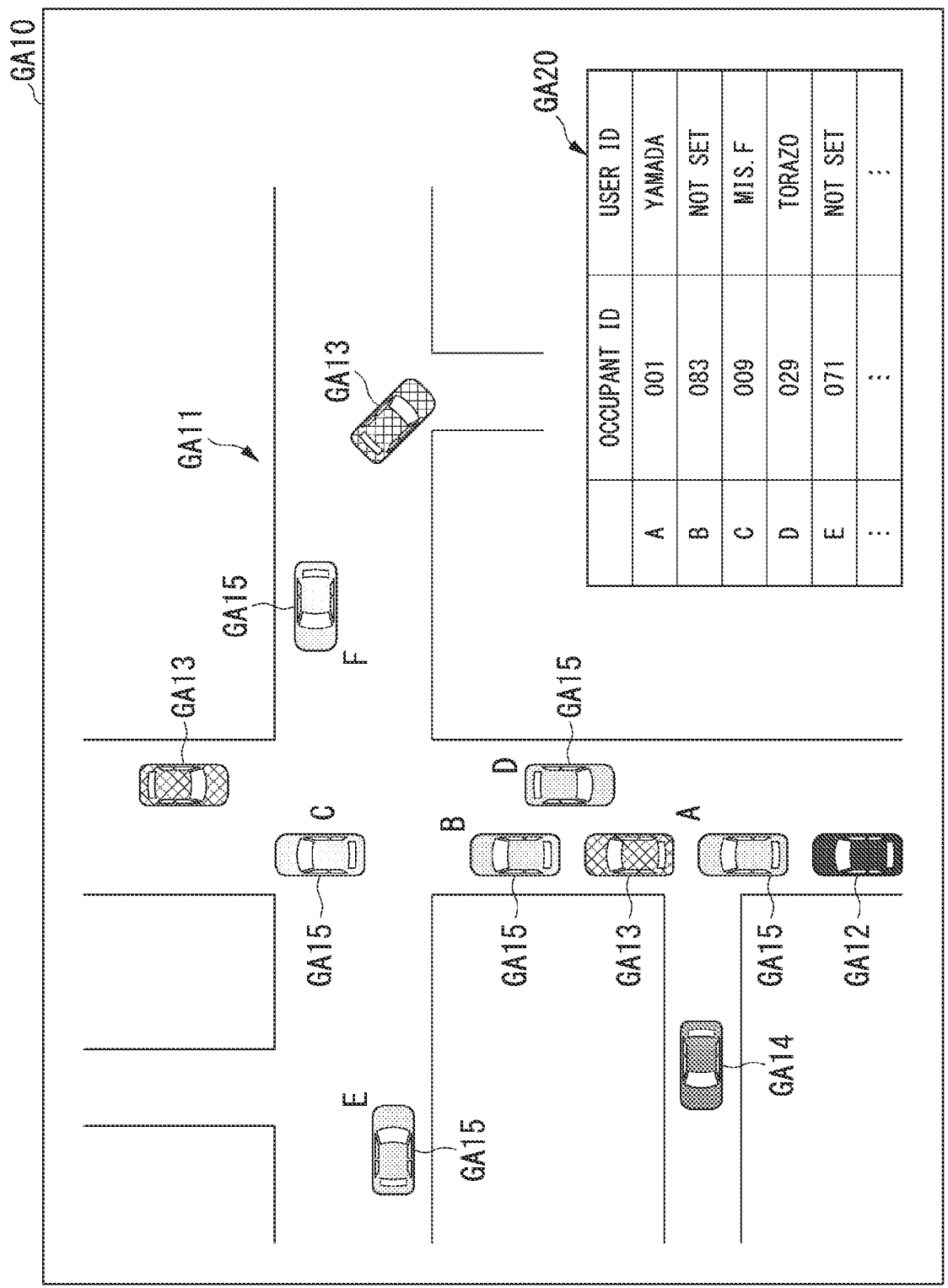
FIG. 7 is a diagram showing an example of a traffic situation image displayed on a mobile object image display device 250.

FIG. 7 is a diagram showing an example of the traffic situation image displayed on the mobile object image display device 250. FIG. 7 is an image displayed on the mobile object image display device 250 and includes a traffic situation image GA10 and a switching-allowed mobile object list image GA20. The traffic situation image GA10 includes, for example, a road image GA11, a target mobile object image GA12, a communicative mobile object image GA13, an incommunicative mobile object image GA14, and a switching-allowed mobile object image GA15.

The road image GA11 is an image showing a road on a map looking down on a predetermined area. The target mobile object image GA12 is an image showing the mobile object having the first device 100 currently communicating with the second device 200 mounted on. The communicative mobile object image GA13 is an image showing a mobile object on which the first device 100 capable of communicating with the second device 200 is mounted. The incommunicative mobile object image GA14 is an image showing a mobile object on which the first device 100 that cannot communicate with the second device 200 is mounted. The switching-allowed mobile object image GA15 is an image showing a mobile object on which the first device 100 that can be matched with the second device 200 is mounted.

The target mobile object image GA12, the communicative mobile object image GA13, the incommunicative mobile object image GA14, and the switching-allowed mobile object image GA15 are displayed on the traffic situation image GA10 in a display aspect changed according to whether or not the communication between the first device 100 mounted on the mobile object indicated by each image and the second device 200 is possible. For example, the switching-allowed mobile object image GA15 is highlighted more conspicuously than the target mobile object image GA12, the communicative mobile object image GA13, and the incommunicative mobile object image GA14, and is displayed with high brightness, for example.

The target mobile object image GA12 may be displayed to be highlighted to an extent equivalent or more than the switching-allowed mobile object image GA15. The communicative mobile object image GA13 and the incommunicative mobile object image GA14 may be displayed in the same aspect. An identification code for identifying the mobile object is displayed using one alphabetic character near the switching-allowed mobile object image GA15. The identification code may be, for example, a character other than the alphabet, and may be a symbol, color, or the like. Whether or not the communication is possible may be based on, for example, a relationship between the user U that is a matching target included in the user data 360 and the occupant P or may be based on the provision possibility information set by the occupant P.

The switching-allowed mobile object list image GA20 is character information on the mobile object having the first device 100 mounted thereon, which can be matched with the second device 200. The identification code displayed near the switching-allowed mobile object image GA15 included in the traffic situation image GA10, the occupant ID given to the occupant P boarding the mobile object, and a user name of the occupant P are included in the switching-allowed mobile object list image GA20. The user name is, for example, a name of the user U registered by the user U in advance. The switching-allowed mobile object list image GA20 is displayed, for example, at a corner of the traffic situation image GA10, in this example, a right corner.

The HMI 260 is a touch panel, an audio response device (an agent device), or the switch described above. The HMI 260 receives various instructions of the user U with respect to the second device 200. The HMI 260 receives, for example, a matching request operation, a surroundings information request operation, the first operation, and the second operation.

The matching request operation is an operation for transmitting the matching request. The surroundings information request operation is an operation for transmitting the surroundings information request. The first operation and the second operation are operations for stopping and starting the provision of information between the first device 100 and the second device 200, respectively, as described above.

The second control device 270 includes, for example, a processor such as a CPU, and a storage medium that is connected to the processor and stores a program (a group of instructions), and the processor may execute the group of instructions to control each unit of the second device 200. For the second device 200, all functions shown in FIG. 5 may be integrated into the VR goggle.

<Functional Configuration>

Hereinafter, a functional configuration of the first control device 170 and the second control device 270 will be described. It is assumed that, in first and second examples to be shown below, generation, transmission, or the like of information that is provided between the first control device 170 and the second control device 270 is mainly performed, and it is assumed that the management server 300 manages matching of simulated boarding between the occupant P and the user U.

First Example

Figure 8:
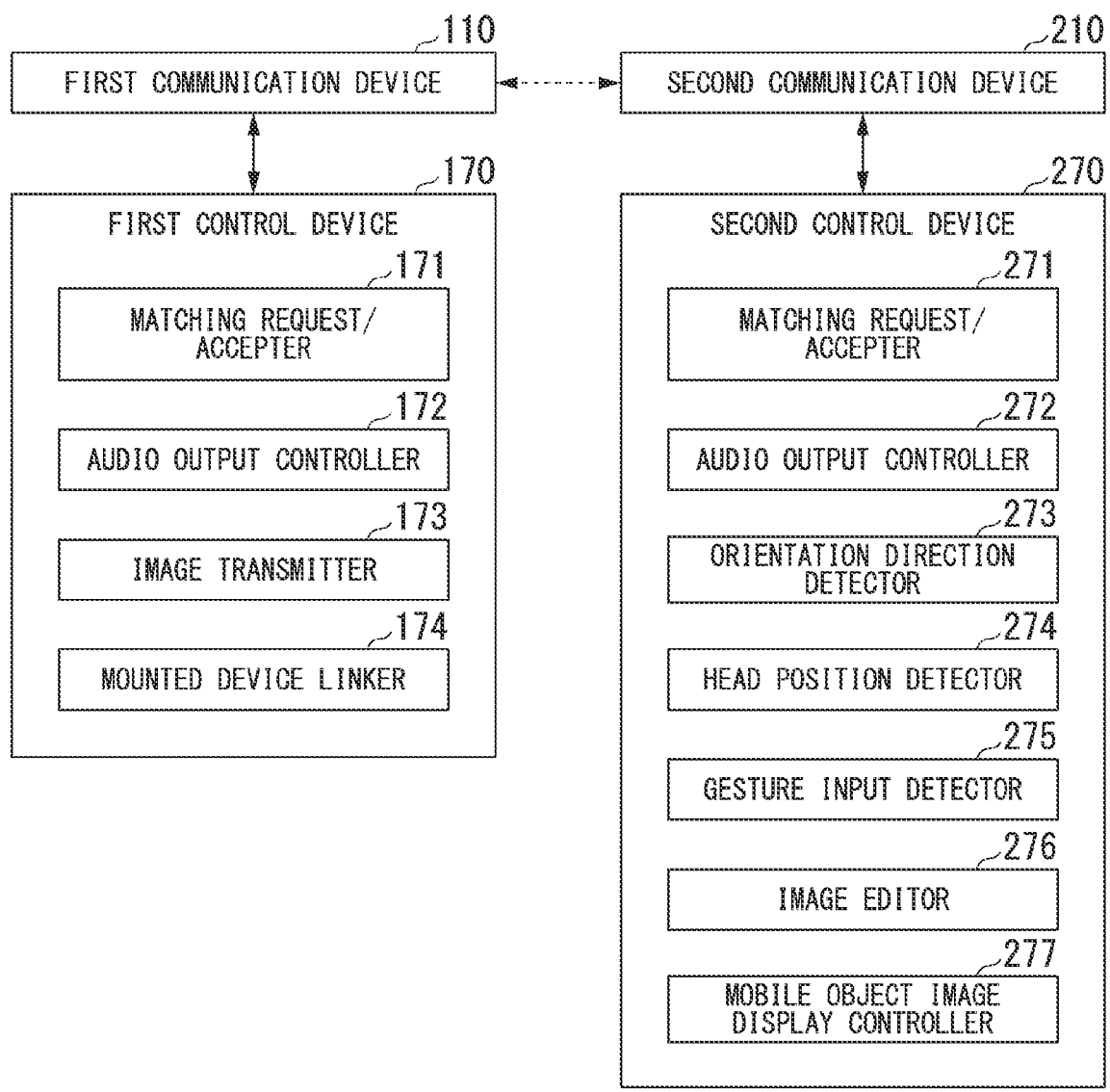
FIG. 8 is a diagram showing a first example of functional configurations of a first control device 170 and a second control device 270.

FIG. 8 is a diagram showing a first example of functional configurations of the first control device 170 and the second control device 270. In the first example, the first control device 170 includes a matching request accepter 171, an audio output controller 172, an image transmitter 173, and a mounted device linker 174. The second control device 270 includes a matching request accepter 271, an audio output controller 272, an orientation direction detector 273, a head position detector 274, a gesture input detector 275, an image editor 276, and a mobile object image display controller 277. These functional units are realized, for example, by a processor such as a CPU executing a program (a group of instructions). Some or all of these components may be realized by hardware (including circuitry) such as an LSI, ASIC, FPGA, or GPU, or may be realized by cooperation of software and hardware.

The matching request accepter 171 uses the HMI 160 to receive an input of the matching request from the occupant P and transmit the matching request to the management server 300, or uses the HMI 160 to receive an input of acceptance for the matching request received from the management server 300 and transmit the acceptance to the management server 300. The matching request accepter 171 controls the first communication device 110 so that the second device 200 of the user U with which matching has been established is a communication partner. The matching request accepter 171, for example, may receive settings of the provision possibility information indicating information of which provision is permitted from the occupant P when the matching request accepter 171 accepts the matching request obtained from the management server 300. The matching request accepter 171 may specify or limit the user U (or the second device 200) that is the matching target according to an instruction from the user U. In this case, the first communication device 110 transmits information on specifying or restriction of the matching target to the management server 300.

The audio output controller 172 controls the first speaker 140 as described above.

After communication with the second device 200 is started, the image transmitter 173 uses the first communication device 110 to transmit the mobile object image A1 to the second device 200. The mobile object image A1 may include, for example, an interior image captured by the interior camera 132 and/or an exterior image captured by the exterior camera 134.

The mounted device linker 174 controls the control target device 190 on the basis of an instruction signal input from the second device 200. The mounted device linker 174 may perform control when the occupant P permits the user U to control the control target device 190.

The matching request accepter 271 uses the HMI 260 to receive input of the matching request from the user U and transmit the matching request to the management server 300, and uses the HMI 260 to receive input of acceptance to the matching request received from the management server 300 and transmit the acceptance to the management server 300. The matching request accepter 271 controls the second communication device 210 so that the first device 100 of the occupant P with which matching has been established is a communication partner. The matching request accepter 271 may present, for example, information to be provided, to the user U, so that the user U can confirm the information, and then receive an instruction regarding the matching target. The matching request accepter 271 may specify or limit the occupant P (or the first device 100) that is a matching target according to the instruction from the user U. In this case, the second communication device 210 transmits information on specifying or restriction of the matching target to the management server 300.

The audio output controller 272 controls the second speaker 240 as described above.

The orientation direction detector 273 detects the orientation direction φ on the basis of an output of the orientation direction detection device 232. The head position detector 274 detects the height of the head of the user U on the basis of an output of the head position detection device 234. The head position may be expressed as three-dimensional coordinates, or simply the height of the head may be detected as the head position. The gesture input detector 275 detects a user U's gesture input on the basis of an output of the motion sensor 236.

The image editor 276, for example, performs a process of cutting out the image A2 corresponding to the orientation direction φ viewed from the passenger seat S2, from the mobile object image A1 (FIG. 6). Although in the example of FIG. 6, the orientation direction φ with respect to a left-right movement of the head of the user U is shown, a process of cutting out an image corresponding to the orientation direction with respect to an up-down movement of the head may be performed. The mobile object image display controller 277 causes the mobile object image display device 250 to display the image A2 cut out by the image editor 276. In this case, the image editor 276 may cause the mobile object image display device 250 to display an image corresponding to the orientation direction φ viewed from the height indicated by the height information of the head of the user U. For example, the image editor 276 switches between an interior image and an exterior image according to a distance of the head of the user U from a reference position (for example, an amount of movement in an upward direction or an amount of movement in a lateral direction) and causes the image to be displayed.

Second Example

Figure 9:
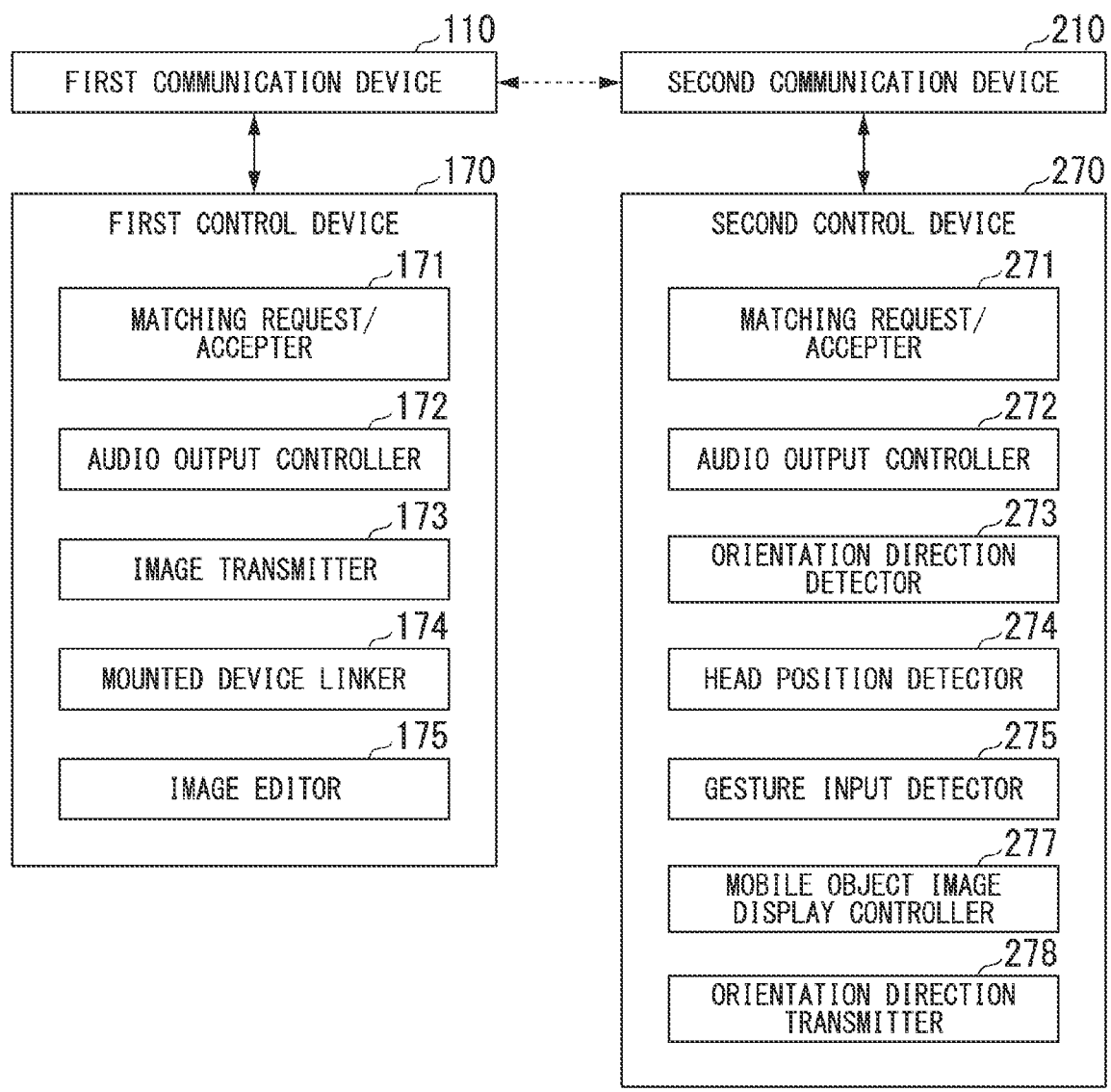
FIG. 9 is a diagram showing a second example of the functional configuration of the first control device 170 and the second control device 270.

FIG. 9 is a diagram showing a second example of the functional configurations of the first control device 170 and the second control device 270. The second example is different from the first example of FIG. 8 in that the first control device 170 includes an image editor 175 and the second control device 270 does not include an image editor 276 but includes an orientation direction transmitter 278. Since the other components basically have the same functions as those in the first example, a description thereof will be omitted here.

The orientation direction transmitter 278 transmits the orientation direction φ detected by the orientation direction detector 273 to the first device 100 using the second communication device 210.

The image editor 175 performs a process of cutting out the image A2 corresponding to the orientation direction φ (transmitted from the second device 200) viewed from the passenger seat, from the mobile object image A1 (FIG. 6). In this case, the image editor 175 may perform a process of acquiring the height information of the head of the user U from the second device 200, and cutting out the image A2 corresponding to the orientation direction φ viewed from the height indicated by the height information.

The image transmitter 173 in the second example uses the first communication device 110 to transmit the image A2 cut out by the image editor 175 to the second device 200. The mobile object image display controller 277 causes the mobile object image display device 250 to display the image A2 transmitted from the first device 100.

<Process Regarding Matching>

Figure 10:
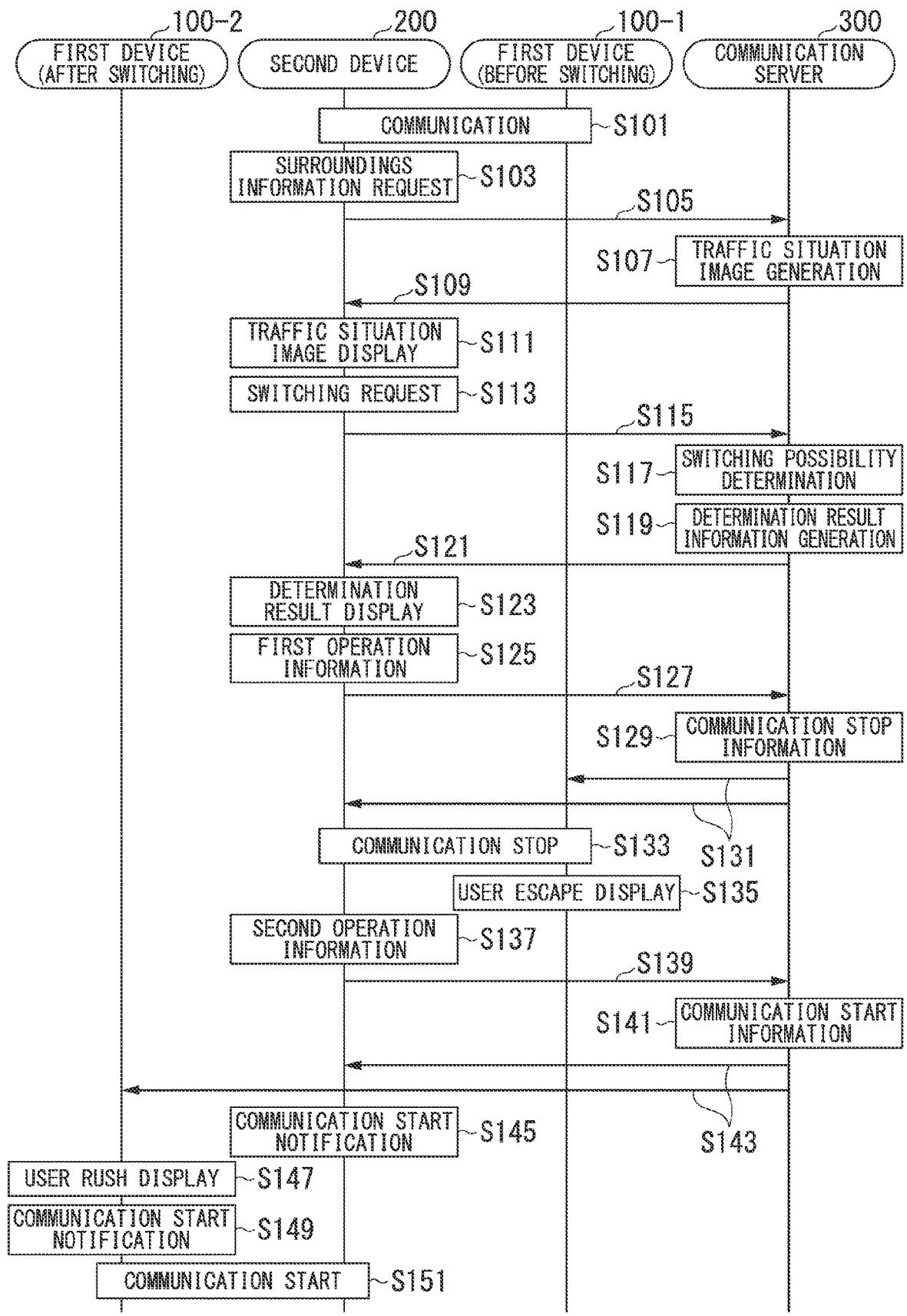
FIG. 10 is a sequence diagram showing an example of a process executed by the information processing system 1.

Next, in the embodiment, a process in which the second device 200 already matched with the first device 100 (a first device 100-1 before switching) switches the first device 100 to be matched with another first device 100 (a first device 100-2 after switching), and transfers the mobile object M of which the user U performs simulated boarding will be described. FIG. 10 is a sequence diagram showing an example of a process executed by the information processing system 1.

Before the first device 100 is switched, for example, the second device 200 communicates with the first device 100-1 before switching (step S101). Subsequently, when the user U who tries to switch the first device 100 does not ascertain the position of the mobile object M around the first device 100-1 before switching, the user U performs the surroundings information request operation in order to know a position of the first device 100 that is a switching target. The second device 200 generates the surroundings information request on the basis of the surroundings information request operation of the user U (step S103). The second device 200 transmits the generated surroundings information request to the management server 300 (step S105).

The management server 300 receives the surroundings information request transmitted by the second device 200 using the communication device 310 and acquires the surroundings information request using the acquirer 315. The management server 300 that has acquired the surroundings information request specifies, in the provider 340, the position of the mobile object M on which the first device 100-1 before switching of which the user U who has transmitted the surroundings information request performs simulated boarding is mounted, and acquire the traffic situation on the basis of the traffic information or the like around the mobile object M to generate a traffic situation image (step S107). The management server 300 transmits the traffic situation image generated by the provider 340 to the second device 200 using the communication device 310 (step S109).

The second device 200 causes the mobile object image display device 250 to display the traffic situation image transmitted by the management server 300 (step S111). In the traffic situation image GA10 shown in FIG. 7, the switching-allowed mobile object image GA15 is highlighted and displayed more conspicuously than the target mobile object image GA12, the communicative mobile object image GA13, and the incommunicative mobile object image GA14. Therefore, the user U can easily recognize the position of the mobile object M of which the user U performs simulated boarding and the position of the mobile object M that is allowed to be switched, by viewing the traffic situation image displayed on the mobile object image display device 250.

For example, when the mobile object M having the first device 100-1 before switching mounted thereon is traveling in a traffic jam, the user U can recognize the leading mobile object M in the traffic jam by checking the traffic situation image displayed on the mobile object image display device 250 in order to set the first device 100 mounted on the leading mobile object M in the traffic jam as a matching target. The second device 200 may cause the second speaker 240 to output the alphabet indicated by the identification code attached to the switching-allowed mobile object image GA15 in the traffic situation image, using vocal sound.

The user U who attempts to switch the first device 100 performs the matching request operation for specifying a matching target that is a switching target. The matching request operation is, for example, an operation for designating the identification code attached to the switching-allowed mobile object image GA15 included in the traffic situation image shown in FIG. 7. The user U, for example, operates the HMI 260 to designate the mobile object M that is a matching target, for example, by specifying a designation number. The second device 200 generates a switching request on the basis of the matching request operation of the user U (step S113). The second device 200 transmits the generated switching request to the management server 300 (step S115). For example, the user U who can see the mobile object M on which the first device 100 serving as a matching target has been mounted and who ascertains the position of the mobile object M around the first device 100-1 before switching may perform the switching request instead of performing the surroundings information request. In this case, the process of steps S103 to S111 may be omitted. Further, the second device 200 may automatically recommend, to the user U, switching candidates suitable for performing a specific task such as confirmation of traffic congestion situation. In this case, the processes of steps S103 to S111 in the process shown in FIG. 10 may be omitted.

The management server 300 receives the switching request transmitted by the second device 200 using the communication device 310 and acquires the switching request using the acquirer 315. The management server 300 that has acquired the switching request determines whether or not switching is possible in the matching processor 330 (step S117). When the matching processor 330 determines whether or not switching is possible, the matching processor 330 refers to the user data 360 stored in the storage 350 to determine whether or not the first device 100 designated by the switching request is the first device 100 that can communicate with the second device 200 that has transmitted the switching request. The matching processor 330 generates the determination result information as a determination result (step S119), and transmits the determination result information to the second device 200 using the communication device 310 (step S121).

The second device 200 causes the mobile object image display device 250 to display the determination result information transmitted by the management server 300 (step S123). The user U can easily recognize whether or not it is possible to simulate boarding on the mobile object M that is a target of the switching request, by viewing the determination result information displayed on the mobile object image display device 250. The second device 200 may cause the second speaker 240 to output the determination result information using vocal sound.

The user U performs the first operation for stopping the provision of information to the first device 100-1 before switching in order to switch the matching target. The second device 200 generates the first operation information on the basis of the first operation of the user U (step S125).

The second device 200 transmits the generated first operation information to the management server 300 (step S127).

The management server 300 receives the transmitted first operation information using the communication device 310 and acquires the first operation information using the acquirer 315. The management server 300 that has acquired the first operation information generates the communication stop information in the provider 340 (step S129). The provider 340 transmits the generated communication stop information to the first device 100-1 before switching and the second device 200 using the communication device 310 (step S131). The management server 300 includes the first display information in the communication stop information to be transmitted to the first device 100-1 before switching.

The first device 100-1 before switching and the second device 200 receive the communication stop information transmitted by the communication device 310 using the first communication device 110 and the second communication device 210, respectively. The first control device 170 and the second control device 270 in the first device 100-1 before switching and the second device 200 stop the communication between second device 200 and the first device 100-1 before switching (step S133).

Further, the first device 100-1 before switching performs a user escape display in an aspect in which the virtually displayed user U escapes from the mobile object M on which the first device 100-1 before switching is mounted, using the user display device 150, on the basis of the first display information transmitted by the management server 300 (step S135). With the user escape display, it is possible to cause the occupant P to visually recognize that the user U will leave the mobile object M on which the first device 100-1 before switching has been mounted.

On the other hand, in the second device 200, the user U performs a second operation for starting provision of information between the second device 200 and the first device 100-2 after switching, after switching the matching target. The second device 200 generates the second operation information on the basis of the second operation of the user U (step S137). The second device 200 transmits the generated second operation information to the management server 300 (step S139).

The management server 300 receives the transmitted second operation information using the communication device 310 and acquires the second operation information using the acquirer 315. The management server 300 that has acquired the second operation information generates communication start information in the provider 340 (step S141). The provider 340 transmits the generated communication start information to the second device 200 and the first device 100-2 after switching using the communication device 310 (step S143). The management server 300 includes the second display information in the communication stop information to be transmitted to the first device 100-2 after switching.

The second device 200 and the first device 100-2 after switching receive the communication start information transmitted by the communication device 310 using the second communication device 210 and the first communication device 110, respectively. The second device 200 that has received the communication start information notifies the user U of the communication start information for starting communication with the first device 100-2 after switching using the mobile object image display device 250 and the second speaker (step S145).

On the other hand, the first device 100-2 after switching that has received the communication start information performs a user rush display in an aspect in which the virtually displayed user U rushes into the mobile object M on which the first device 100-2 after switching is mounted, using the user display device 150 on the basis of the second display information included in the communication start information (step S147). The user display device 150 continues to display the virtual user U in the interior of the mobile object M after performing the user rush display.

Subsequently, the first device 100-2 after switching allows the continuously displayed virtual user U to generate a simulated audio using the user display device 150, and notifies the occupant P of the communication start information for starting the communication with the second device 200 (step S149). Thereafter, communication between the first device 100-2 after switching and the second device 200 is started (step S151).

In the embodiment, the first device 100 may limit the second device 200 with which the communication is possible according to the instruction from the occupant P. In this case, when the management server 300 determines in step S117 whether the first device 100 is the first device 100 that can communicate with the second device 200, the management server 300 may inquiry about whether or not to permit the first device 100 designated by the switching request to communicate with the second device 200. When the communication is permitted, a determination result indicating that the communication with the first device 100 is possible may be obtained.

Further, although the user escape display or the user rush display is performed by the user display device 150 in the first device 100 when the first device 100 serving as a matching target is switched, a display corresponding to the user escape display or the user rush display may be performed by the mobile object image display device 250 in the second device 200. Further, an example of the display corresponding to the mobile object escape display is a display of scenery that the user U visually recognizes when the user U virtually escapes from the mobile object M. Further, an example of the display corresponding to the mobile object rush display is a display of scenery that the user U visually recognizes when the user U virtually rushes into the mobile object M.

Further, the first device 100 may transmit, to the management server 300, the audio in the mobile object M collected by the first microphone 120 in the mobile object M on which the first device 100 is mounted, and the management server 300 may acquire the audio. In this case, for example, when the surroundings information request is transmitted by the second device 200, the management server 300 may transmit the acquired audio of the mobile object M together with the traffic situation image to the second device 200 for each mobile object M so that the audio can be reproduced by the second speaker 240 of the second device 200.

In the information processing system 1, a case in which the user U can visually recognize any direction seen from the passenger seat S2 has been described, a direction in which the user U can visually recognize may be restricted depending on, for example, arrangements at the time of matching or a setting regarding whether or not provision by the occupant P is possible. For example, there may be a case in which the occupant P may provide scenery in the traveling direction of the mobile object M or scenery on a side opposite to the driver seat S1, but does not want to display his or her own image. This assumes a case in which the occupant P and the user U want to confirm a driving feeling of the mobile object M or to visually recognize scenery of a desired city, regardless of whether the occupant P and the user U are family members or friends. In this case, when the matching processor 330 or the provider 340 of the management server 300 performs a process such as matching, such restrictions are set, and the first control device 170 or the second control device 270 masks an angle range that is not visible or performs correction so that the orientation direction φ is not oriented in a restricted direction, according to a setting. Further, since information on such restrictions relates to the privacy of the occupant P, the information may be set on the first device 100 side.

Further, the mobile object image display device 250 may replace a portion in the interior of the mobile object M in which a predetermined article is captured, in the image captured by the camera unit 130, with an image (CG image) drawn by computer processing, and perform a display. FIG.

Figure 11:
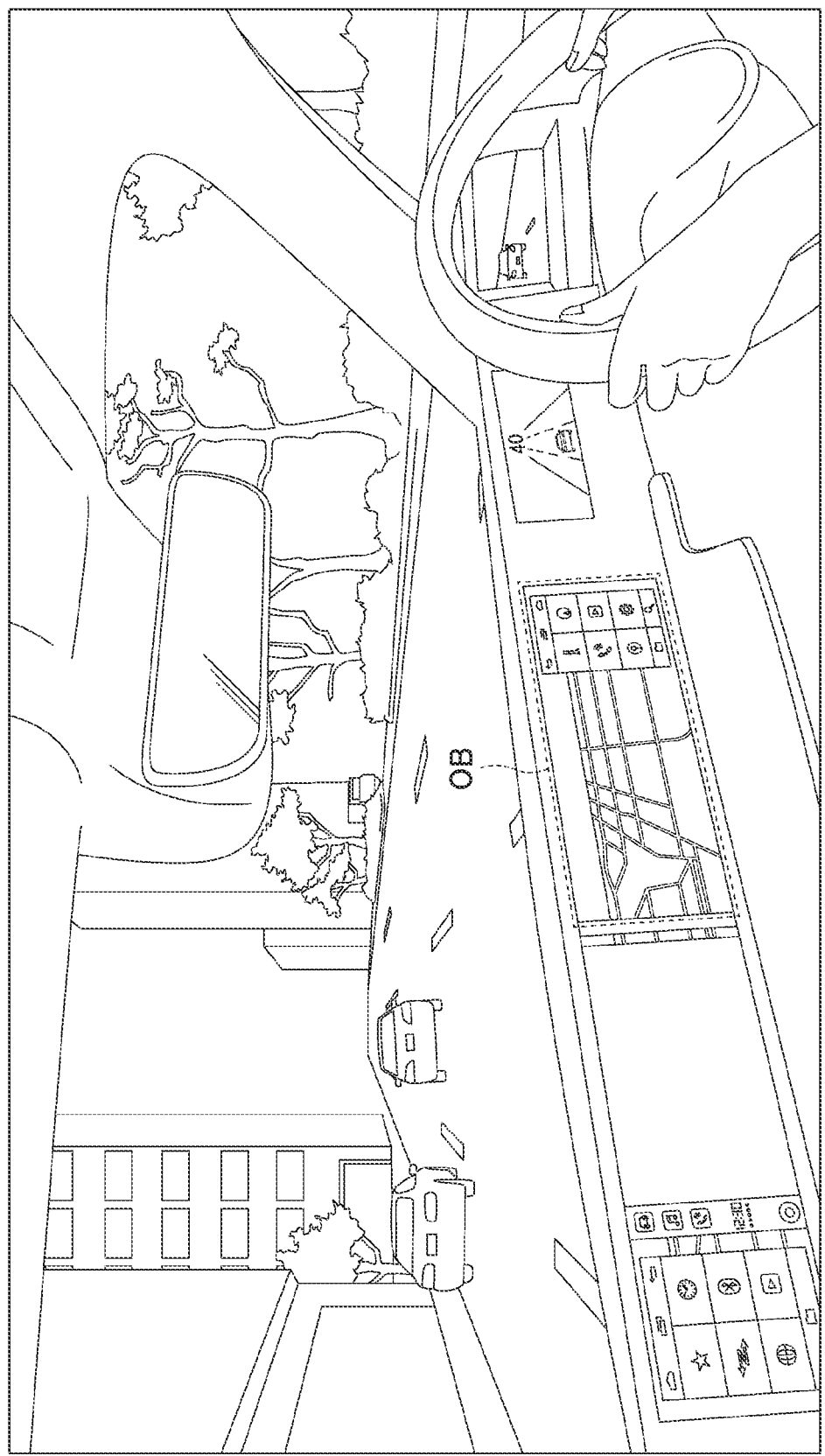
FIG. 11 is a diagram showing an example of displaying a replacement image.

11 is a diagram showing an example of a display of a replacement image. In FIG. 11, OB indicates a display device that performs a navigation display or the like, and is an example of the "predetermined article." When an image obtained by imaging a display screen of the display device is displayed as it is, the image may be blurred or the visibility may deteriorate due to reflection of light. Therefore, the mobile object image display device 250 may acquire, from the first device 100, data for forming the display screen of the display device or image data drawn by computer processing in the mobile object M, embed an image redrawn through computer processing from the data or the acquired image data into (an image obtained by editing) the image captured by the camera unit 130, and display a resultant image. In this case, a position of an article in the interior of the mobile object M, which is the predetermined article, is shared in advance between the first device 100 and the second device 200, and the mobile object image display controller 277 determines whether or not the predetermined article is included in the image to be displayed in the mobile object image display device 250 on the basis of the orientation direction φ, and performs replacement of the image as described above when determining that the predetermined article is included. Further, the "predetermined article" may be a head or face of the occupant P. In this case, a CG image such as an avatar may be changed according to a display of the occupant P. At least part of the image data (CG image) or the like described above may be provided from a provided information DB of the management server 300.

Conclusion

According to the information processing system 1 configured as described above, even when there are a plurality of first devices 100 mounted on the mobile object M capable of communicating with the second device 200 used by the user U, it is possible to easily adjust a relationship between the second device 200 and the first device 100. Further, according to the information processing system 1, it is possible to enhance the sense of realism given to both the occupant P of the mobile object M and the user U who is at a location different from the mobile object M. Further, according to the embodiment, it is possible to improve the visibility of the user U and the safety of the occupant P and further improve safety of traffic, thereby contributing to the development of a sustainable transportation system. In the embodiment, since the image corresponding to the orientation direction φ of the user U as viewed from the passenger seat S2 is displayed to the user U, the user U can recognize scenery as if the user U is sitting on the passenger seat S2 and looking around. Further, the first speaker 140 localizes the audio image so that the occupant P can hear the audio from the passenger seat S2, and outputs the audio uttered by the user U, so that the occupant P can have a conversation with the user U as if the user U is in the passenger seat S2. Further, the second speaker 240 localizes the audio image so that the user U can hear the audio from the position of the occupant P as seen from the passenger seat S2, and outputs the audio uttered by the occupant P, so that the user U can have a conversation with the occupant P as if the user U is in the passenger seat S2.

Usage Example

The information processing system 1 can be used in the following aspects.

(A) An aspect in which the occupant P and the user U are in a family, friend, or other relationship, and the user U is provided with virtual drive. The user U can talk with the occupant P about, for example, surrounding scenery of the mobile object M while viewing the image.

(B) An aspect in which the occupant P is a general user, and the user U is a provider of a route guidance service, a driving instruction service, or the like. The user U can guide a route at a location that is difficult to understand with a navigation device or that is not shown on a map, or instruct driving operations while viewing surrounding scenery of the mobile object M.

(C) An aspect in which the occupant P is a celebrity, the user U is a general user, and the user U is provided with a commercial-based virtual drive. In this case, a plurality of users U may be associated with one occupant P at the same time and, for example, transfer of audio from the user U may be set to OFF.

The aspect for carrying out the present invention has been described above using the embodiments, but the present invention is not limited to such embodiments at all, and various modifications and replacements can be made without departing from the gist of the present invention.

What is claimed is:

1. A simulated boarding experience system including:
a plurality of first devices mounted on respective mobile objects that are boardable by occupants;
a second device used by a user at a location different from locations of the mobile objects; and
an information management device that comprises a processor and manages information provided to the plurality of first devices and the second device, wherein the processor is configured to execute a program to:
acquire information from the plurality of first devices and the second device;
perform matching processing that selects, as a matching target from among the plurality of first devices, a first device to be operated together with the second device;
establish, based on a result of the matching processing, communication between the first device and the second device;
render, on the second device via the communication, a simulated boarding experience in a mobile object, of the mobile objects, on which the first device is mounted;
receive, via interaction with the second device while the second device is rendering the simulated boarding experience, a designation from the user of another first device of the plurality of first devices as the matching target that is to be operated together with the second device; and
in response to receipt of the designation, switch the matching target from the first device to the other first device, wherein switching of the matching target comprises stopping the communication between the first device and the second device, establishing another communication between the other first device and the second device, and rendering, on the second device via the other communication, a simulated boarding experience in another mobile object, of the mobile objects, on which the other first device is mounted.

2. The system according to claim 1, wherein the processor is configured to execute the program to:
further receive a first operation and a second operation of the user; and stop provision of information between the first device as the matching target and the second device based on the first operation of the user, and start the provision of information between the first device as the matching target and the second device based on the second operation of the user.

3. The system according to claim 2, wherein
the first device comprises a user display device configured to virtually display the user, and
the processor is configured to execute the program to:
provide the first device with first display information for causing the user display device to render a virtual display of the user in an aspect in which the user exits the mobile object when stopping the provision of information between the first device as the matching target and the second device.

4. The system according to claim 2, wherein
the first device comprises a user display device configured to virtually display the user, and
the processor is configured to execute the program to:
provide the first device with display information for causing the user display device to render a virtual display of the user in an aspect in which the user enters the mobile object when starting the provision of the information between the first device as the matching target and the second device.

5. The system according to claim 3, wherein
the first device further comprises a speaker configured to output audio, and
the processor is configured to execute the program to:
provide audio information for causing the speaker to output audio, of which a volume has been adjusted, to the first device based on a position of the user in the virtual display within the mobile object when the virtually displayed user escapes from or rushes into the mobile object.

6. The system according to claim 1, wherein the processor is configured to execute the program to:
determine a traffic situation around the first device selected as the matching target by the matching processing; and
provide information about a surrounding traffic situation around the first device to the second device before the designation from the user is received, wherein the information about the surrounding traffic situation is generated based on the traffic situation.

7. The system according to claim 6, wherein the surrounding traffic situation includes a traffic situation image expressed on a map as a bird's-eye view of the mobile object on which the first device is mounted and a surrounding area around the mobile object.

8. The system according to claim 7, wherein the processor is configured to execute the program to:
display a plurality of the mobile objects on the map, and
generate a traffic situation image for changing a display aspect of the mobile object on the map according to a determination of whether the plurality of first devices are able to communicate with the second device.

9. A method for a simulated boarding experience system that includes:
a plurality of first devices mounted on respective mobile objects that are boardable by an occupant;
a second device used by a user at a location different from locations of the mobile objects; and
an information management device comprising a processor and configured to manage information provided to the plurality of first devices and the second device, the method comprising:
acquiring, by the information management device, information from the plurality of first devices and the second device;
performing, by the information management device, matching processing that selects, as a matching target from among the plurality of first devices, a first device to be operated together with the second device;
establishing, by the information management device based on a result of the matching processing, communication between the first device and the second device;
rendering, by the information management device on the second device via the communication, a simulated boarding experience in a mobile object, of the mobile objects, on which the first device is mounted;
receiving, by the information management device via interaction with the second device while the second device is rendering the simulated boarding experience, a designation from the user of another first device of the plurality of first devices as the matching target that is to be operated together with the second device; and
in response to the receiving of the designation, switching, by the information management device, the matching target from the first device to the other first device, wherein the switching of the matching target comprises stopping the communication between the first device and the second device, establishing another communication between the other first device and the second device, and rendering, on the second device via the other communication, a simulated boarding experience in another mobile object, of the mobile objects, on which the other first device is mounted.

10. A computer-readable non-transitory storage medium having a program stored therein, the program being used in a simulated boarding experience system including:
a plurality of first devices mounted on respective mobile objects that are boardable by an occupant;
a second device used by a user at a location that is different from respective locations of the mobile objects; and
an information management device for managing information provided to the plurality of first devices and the second device, the program causing a computer of the information management device to perform operations, the operations comprising:
acquiring information from the plurality of first devices and the second device;
performing matching processing that selects, as a matching target from among the plurality of first devices, a first device to be operated together with the second device;
establishing, based on a result of the matching processing, communication between the first device and the second device;
rendering, on the second device via the communication, a simulated boarding experience in a mobile object, of the mobile objects, on which the first device is mounted;
receiving, via interaction with the second device while the second device is rendering the simulated boarding experience, a designation from the user of another first device of the plurality of first devices as the matching target that is to be operated together with the second device; and in response to the receiving of the designation, switching the matching target from the first device to the other first device, wherein the switching of the matching target comprises stopping the communication between the first device and the second device, establishing another communication between the other first device and the second device, and rendering, on the second device via the other communication, a simulated boarding experience in another mobile object, of the mobile objects, on which the other first device is mounted.

* * * * *